US007070841B2

(12) United States Patent
Benim et al.

(10) Patent No.: US 7,070,841 B2
(45) Date of Patent: Jul. 4, 2006

(54) INSULATING LABEL STOCK

(75) Inventors: Thomas E. Benim, Kinston, NC (US); Susan Gogol Chamberlin, Wilmington, DE (US); Jeffrey Allen Chambers, Hockessin, DE (US); Steven R. Cosentino, Quinton, VA (US); Peter R. Hunderup, Richmond, VA (US); Ross A. Lee, Chesapeake City, MD (US); Susan D. Procaccini, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/832,503

(22) Filed: Apr. 11, 2001

(65) Prior Publication Data

US 2003/0003249 A1 Jan. 2, 2003

(51) Int. Cl.
*B32B 27/08* (2006.01)

(52) U.S. Cl. .................. 428/35.7; 428/40.1; 428/42.1; 428/212; 428/211; 428/213; 428/214; 428/215; 428/113; 428/423.7; 428/424.8; 428/458; 428/475.2; 428/478.8; 428/479; 428/220; 428/36.1; 428/290; 428/286; 40/306; 40/310; 283/81

(58) Field of Classification Search ............... 428/36.1, 428/290, 286, 42.1, 40.1, 211, 212, 213, 214, 428/215, 220, 113, 423.7, 424.8, 458, 475.2, 428/478.8, 479.6; 40/306, 310; 283/81
See application file for complete search history.

(56) References Cited

U.S. PATENT DOCUMENTS

| | | | | |
|---|---|---|---|---|
| 3,401,475 A | | 9/1968 | Morehouse et al. | |
| 4,273,816 A | * | 6/1981 | Tollette | 428/34.2 |
| 4,871,597 A | | 10/1989 | Hobson | |
| 5,164,254 A | | 11/1992 | Todd et al. | |
| 5,404,667 A | | 4/1995 | Schmitter | |
| 5,453,326 A | | 9/1995 | Siddiqui | |

(Continued)

FOREIGN PATENT DOCUMENTS

| | | |
|---|---|---|
| DE | 130 564 | 4/1978 |
| EP | 0 101 340 A1 | 2/1984 |
| EP | 1 064 897 A1 | 1/2001 |
| WO | WO 91/04152 A1 | 4/1991 |

OTHER PUBLICATIONS

WWW.3M.COM, 3M™ Composite Electrical Tape.
McIntyre, Professor J. E., Daniels, P.N., Editors, Textile Terms and Definitions, 1997, p. 66, p. 351, 10th Edition, The Textile Institute, Biddles Limited, UK.

(Continued)

*Primary Examiner*—Patrick Joseph Ryan
*Assistant Examiner*—Janet Rhee

(57) ABSTRACT

An insulating label stock includes a thermal insulating layer, which may a fiberfill batt. The batt is laminated to at least one layer of film, paper or fabric. The label stock can be wrapped around a container, such as a can, bottle or pouch. The label stock may be coated with a coating material so that it is printable, thus imparting both insulating properties and print capability to a container.

19 Claims, 5 Drawing Sheets

U.S. PATENT DOCUMENTS

| | | | | |
|---|---|---|---|---|
| 5,527,600 | A * | 6/1996 | Frankosky et al. | 428/286 |
| 5,851,617 | A * | 12/1998 | Keiser | 428/41.8 |
| 6,150,013 | A | 11/2000 | Balaji et al. | |
| 6,286,872 | B1 * | 9/2001 | Barre | 283/81 |
| 6,379,764 | B1 * | 4/2002 | Pusateri et al. | 428/40.1 |
| 6,479,431 | B1 * | 11/2002 | McFall et al. | 503/200 |

OTHER PUBLICATIONS

U.S. Nonprovisional Appl. No. 10/271,377, Thomas E. Benim, et al., Filed Oct. 15, 2002.
U.S. Nonprovisional Appl. No. 10/270,802, Thomas E. Benim, et al., Filed Oct. 15, 2002.
U.S. Nonprovisional Appl. No. 10/270,801, Thomas E. Benim, et al., Filed Oct. 15, 2002.
Encyclopedia of Polymer Science and Engineering, vol. 16, Styrene Polymers to Toys, John Wiley & Sons, NY, 1989, pp. 737-738.
Handbook of Physical and Mechanical Testing of Paper and Paperboard, vol. 2, Edited by Richard E. Mark and Koji Murakami, Marcel Dekker Inc., NY, p. 250.
Operation Manual, Q Test, Automated Operation Using the Controller, Heat Flow Meter Thermal Conductivity Instrumentation, Holometrix Inc., Bedford, MA, p. A1-1.

* cited by examiner

INSULATING LABEL STOCK

BACKGROUND OF THE INVENTION

1. Field of the Invention

The present invention relates to an insulating label stock for a container which comprises a thermal insulating layer which is bonded to a face material. The face material may be film, paper or fabric. The face material can be coated with a coating material so that it is printable, thus imparting both insulating properties and print capability to the container.

2. Description of Related Art

Insulated enclosures for containers are known, such as that disclosed in U.S. Pat. No. 4,871,597. This enclosure includes a first, or inner-most fabric layer, a second inner-most insulating layer which includes a polymeric foam, a third inner-most metallized polymer film reflective layer, and an outer-most fabric mesh layer. However, the use of four different layers, although providing good insulation for the container, can be cumbersome, which limits the function of such enclosure for other purposes, such as a label stock.

In the label art, different materials and different layers are generally not used in a label stock. This is due in part to the fact that it has been too costly to laminate the different materials and layers. Moreover, in order to laminate different materials, one of which imparts thermal insulation to the label and has some thickness or loft, the materials must be heated to a temperature which collapses the lofty material.

Also known in the film art is a thin electrical tape which comprises a polyester web-reinforced polyester film, as disclosed in 3M Utilities and Telecommunications OEM. However, this tape, which at its thickest is 0.0075 inch (0.0190 cm.), is not suitable for use as an insulator for a container.

Thus, there exists a need to design an insulator for a container which is inexpensive to manufacture. Such an insulator would be thick enough to provide adequate insulation, but thin enough to be flexible so that it will wrap around the container. Ideally, such insulator would be multi-functional so that it could also serve as a label.

BRIEF SUMMARY OF THE INVENTION

The present invention overcomes the problems associated with the prior art by providing a label stock which acts as an insulator for a container. This insulator has enough loft, i.e., is thick enough (greater than 0.0075" (0.0190 cm.)) so as to provide adequate insulation for the container, but thin enough so that it can be easily wrapped around a container. Because of this feature, this insulator can function as a label stock also. Thus, the use of a label made from the label stock of the present invention has the advantage of maintaining the temperature of the contents of the container longer than the use of a label alone. Moreover, the label stock of the present invention is printable, thereby enhancing its use as a label for a container.

Another advantage of the label stock of the present invention is that it is less costly to manufacture than a laminated structure, since in a preferred embodiment it includes a co-extruded film with a heat-sealable adhesive which is used to adhere the film to an insulating layer.

Moreover, in the preferred embodiment where the film and the insulating layer are both made of polyester, and include compatible adhesives, the label stock of the present invention is wholly recyclable, thereby providing significant environmental advantages over known labels or insulators of the prior art.

In accordance with the present invention, the insulating label stock of the present invention comprises a thermal insulating layer having a thermal resistance of 0.05 to 0.5 CLO (0.0077 to 0.077 $m^2$*K/W) which is laminated to a face material, wherein the label stock is at least 0.0075 inch (0.0190 cm.) thick.

DETAILED DESCRIPTION OF THE INVENTION

In accordance with the present invention, there is provided an insulating label stock. Such a stock is shown generally at 5 in FIGS. 1 and 2 and rolled up at 90 in FIG. 7. Label stock is cut into individual lengths to make labels, which are shown applied to a container at 15 in FIGS. 3–6. The label stock of the present invention includes a thermal insulating layer, shown at 30 in FIGS. 1 and 2. This thermal insulating layer has a thermal resistance, as measured in units of insulation, or CLO, of 0.05 to 0.5. The CLO unit is defined as a unit of thermal resistance of a garment. The SI unit of thermal resistance is the square-meter kelvin per watt ($m^2$*K/W) (See "Textile Terms and Definitions", Tenth Edition, The Textile Institute, (1995), pp. 66, 350). Thus, the range of thermal resistance in SI units of the thermal insulating layer of the present invention is 0.0077 to 0.077 $m^2$*K/W. Although CLO is defined in terms of a garment, this measurement can be used to describe the thermal resistance of any textile system, and is used herein to describe the thermal resistance of the thermal insulating layer of the present invention. CLO values depend on the material used for the insulating layer and its thickness. CLO values of labels made without the thermal insulating layer of the present invention were below the lower end of the range (0.05 CLO, or 0.0077 $m^2$*K/W).

The thermal insulating layer comprises an organic thermoplastic fiber based material comprising polyester, polyethylene or polypropylene. In a preferred embodiment, the thermal insulating layer is a fiberfill batt comprising polyester. A fiberfill batt sold as THERMOLITE® Active Original by E.I. du Pont de Nemours and Company is especially suitable for use with the present invention. The fiberfill batt used with the present invention has an areal weight in the range of 10 gm/m$^2$ to 200 gm/m$^2$, and a bulk density of less than 0.3 gm/cm$^3$. Alternatively, the thermal insulating layer may comprise melt blown fibers, such as melt blown polyolefins, sold as THINSULATE®, by 3M.

Many other variations of insulating material for the thermal insulating layer can be used with the present invention. For instance, the thermal insulating layer may comprise a foam. The foam may be polyurethane, or any other foam composition as known in the art. Or the thermal insulating layer may be made of an inorganic fiber based material comprising glass wool, borosilicate glass or rockwool.

Alternatively, the thermal insulating layer may comprise a knit fabric, made, for example from a tetrachannel or scalloped oval fiber, sold under the trademark COOLMAX® by E.I. du Pont de Nemours and Company of Wilmington, Del. Or the thermal insulating layer may be a woven or fleece material. The insulating layer could also comprise some sort of nonwoven, such as felt, or a highloft nonwoven or needled nonwoven fabric.

Figure 1:
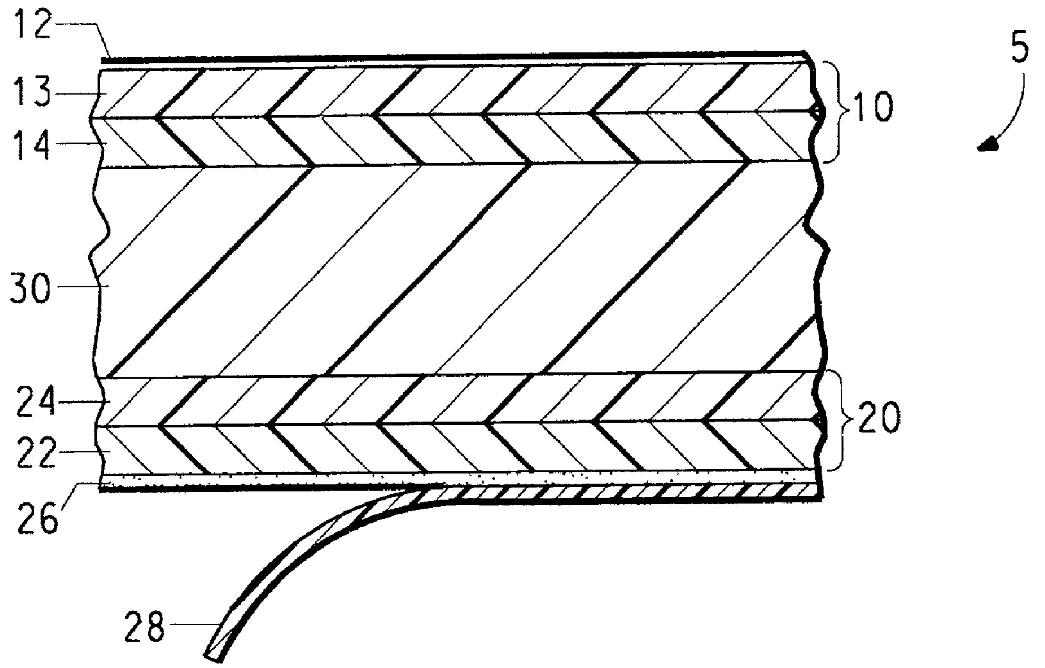
FIG. 1 is a cross-sectional view of a label stock according to the present invention, showing face material on both sides of a thermal insulating layer.
Figure 2:
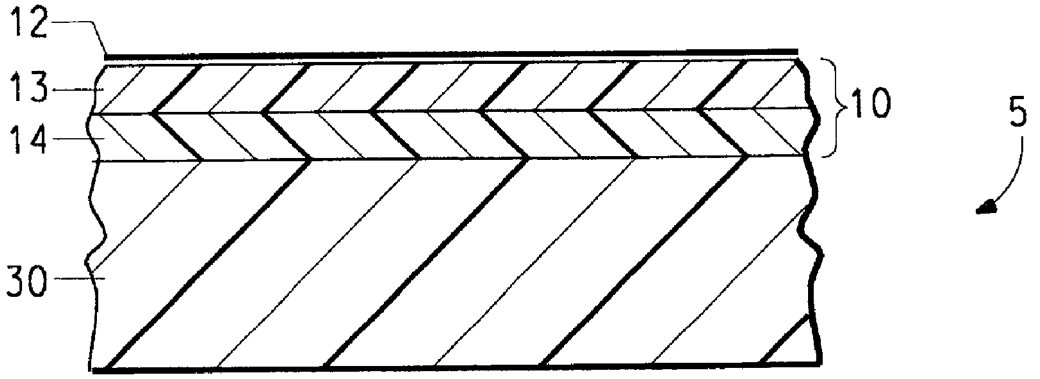
FIG. 2 is a cross-sectional view of the label stock of the present invention, similar to FIG. 1, but showing face material laminated to only one side of the thermal insulating layer.
Figure 3:
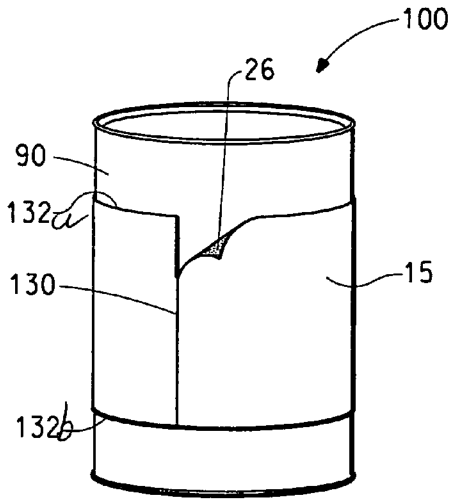
FIG. 3 is a perspective view of a container wrapped with a label cut from a label stock in accordance with the present invention.

The thermal insulating layer is laminated to a face material, shown at 10 in FIGS. 1 and 2 and also at 20 in FIG. 1. By "lamination" is meant uniting layers of material by an adhesive or other means. The face material may be film, paper and/or fabric. The film is made of a thermoplastic material comprising either polyester, polyethylene or polypropylene. In the embodiment illustrated in FIG. 1, the thermal insulating layer is laminated between two sheets of film, paper or fabric. However, it is within the scope of the present invention to laminate a single sheet of face material to the thermal insulating layer, as shown in FIG. 2. The use of a single sheet of face material will not affect the thickness of the label stock substantially, since the thickness of the face material is insignificant compared to the total thickness of the label stock. The label stock of the present invention is greater than 0.0075" (0.0190 cm.) thick, so that it is thick enough to provide adequate insulation for a container. Face material 10, including first layer 13 and second 14 layer as shown in FIGS. 1 and 2 and face material 20, including first layer 22 and second layer 24 as shown in FIG. 1 may be of thickness between 0.0002" (0.0005 cm.) and 0.010" (0.025 cm.). A preferred range for the thickness of the face material is 0.00048" (0.00121 cm.) to 0.0020" (0.0050 cm.).

In a preferred embodiment, hereinafter referred to as the "co-extruded film" embodiment, the face material comprises a film which is co-extruded so that it comprises two layers. Thus, face material 10 comprises a first layer 13 and a second layer 14. In this embodiment, first layer 13 and second layer 14 are made of different materials, but form one sheet of film. Second layer 14 is heat sealable—i.e., it is made of a material which has a lower melting temperature than the material of first layer 13, so that when face material 10 is heated, second layer 14 softens and adheres to the thermal insulating layer when pressure is applied. Similarly, face material 20 comprises a first layer 22 and a second layer 24. Again, first layer 22 and second layer 24 are made of different materials, but form one sheet of film. Second layer 24 is heat sealable—i.e., it is made of a material which has a lower melting temperature than the material of first layer 22, so that when face material 20 is heated, second layer 24 softens and adheres to the thermal insulating layer when pressure is applied.

The label stock of the present invention can further include a coating on the face material. The coating, shown at 12 in FIGS. 1 and 2, is provided on the non-heat sealable surface (i.e., first layers 13 and 22) of the face material. This coating is printable, so that the same stock which provides insulation may also function as a label. The coating is a standard print primer based on aqueous polymer dispersions, emulsions or solutions of acrylic, urethane, polyester or other resins well known in the art. (See, for example, U.S. Pat. No. 5,453,326). Alternatively, if the thermal insulating layer is previously printed, and the face material is clear, the need for coating the face material to make it printable may be eliminated.

In a preferred configuration of the co-extruded film embodiment, films with two different thicknesses are used for the face materials, such as face material 10 and face material 20 in FIG. 1. One specific example of a film which is suitable for use as face material 10 in FIG. 1 is MELINEX® 854, commercially available from DuPont Teijin Films of Wilmington, Del. MELINEX® 854 is a 120 gauge (0.0012 inch, or 0.0030 cm.) thick co-extruded biaxially oriented polyester film. The first layer of this film, such as 13 in FIG. 1, is made from a standard polyester homopolymer, intrinsic viscosity of about 0.590, containing 2500 ppm inorganic slip additive particles. This layer comprises approximately 65% of the total film thickness. A co-polyester resin comprised of 18 weight % isophthalic acid, intrinsic viscosity of about 0.635, containing 2300 ppm inorganic slip additive particles, is co-extruded to form the heat sealable layer (such as 14 in FIG. 1) and comprises 35% of the total film thickness (15–40% preferred). The surface of the first layer opposite the heat sealable layer is coated in-line by a gravure coater (during the film manufacturing process) with a print primer coating (12 in FIG. 1) based on an aqueous polyester dispersion described earlier at a dry coat-weight of 0.03 g/m$^2$. MELINEX® 854 film is also suitable for use as face material 20 in FIG. 1, but this face material is slightly thinner than the face material used as face material 10. In all other aspects, the MELINEX® 854 film used as face material 20 is the same as the MELINEX® 854 film used as face material 10 described above.

According to another aspect of the present invention, the face material may be modified on the surface facing away from the thermal insulating layer to facilitate printing thereon by a corona discharge treatment. Specifically, the surface of first layer 13 or 22 is modified. The corona discharge treatment may be done in addition to, or in lieu of, the coating on the face material. Or, alternatively, on top of the coating, or instead of the coating, a vapor deposited metal layer, such as an aluminum layer, may be deposited on the surface facing away from the thermal insulating layer for decorative purposes and for adding optical effects. If this vapor deposition is done, then corona discharge treatment would typically not be performed in addition to this vapor deposition.

According to another modification of the present invention, the face material may be embossed on the surface facing away from the thermal insulating layer in such patterns as may be desired for decoration. The embossing can be done on top of the coating, after corona discharge treatment, if required, an on top of the vapor deposition. Specifically, pressure and heat may be used to make certain areas of the face material thinner, so that the surface appears raised from the areas which were made thinner. Doing so in a pattern may be used to ornament the label stock. The heat and pressure may be applied by a shaped anvil or iron in a decorative pattern. Alternatively, heat and pressure may be applied by an engraved or etched embossing roller or an engraved reciprocating die in a platen press. The heat should be applied at 200–400° F. (93–204° C.), so that the pressure applied would create permanent indentations in the label stock. The heat should be applied as to soften at least the face material, and perhaps also the thermal insulating layer. Softening the thermal insulating layer is less critical than softening the face material, but helps the embossing process also.

In addition, the surface modification (i.e., the coating or the corona discharge treatment) may be used to faciliate bonding to another surface with an adhesive layer. In order to bond to another surface, an adhesive primer layer, such as that shown at 26 in FIG. 1, is applied to the untreated surface of the face material or to the corona discharge treated surface (but not to a vapor deposition modified or embossed surface). This adhesive primer layer is pressure sensitive to enable application of the label to a container. In addition, a release liner 28 may be provided on the surface of adhesive primer layer 26 as shown in FIG. 1. The function of the release liner is to protect the adhesive until the point of application of the label to a container. Or an adhesive (not an adhesive primer layer) is applied to the modified surface.

The label stock of the present invention may be sealed, such as with a hot knife, at its edges so that fluid cannot penetrate the edges of the label stock. Such edges are shown at 132 in FIGS. 3–6. As can be seen from FIGS. 3–6, these edges 132 include a top edge 132*a* and a bottom edge 132*b*. In the embodiment where two sheets of face material are used, the two sheets of face material are sealed together alone these top and bottom edges. Alternatively, the label stock may be self-sealing. In this self-sealing configuration, the label stock may be folded back onto itself, so that the top and bottom edges are already sealed. A label made from the label stock of the present invention is preferably sealed so that fluid cannot penetrate the edges thereof.

Further in accordance with the present invention, there is provided a container/insulated label stock system. Such a system is shown generally in FIGS. 3–6 at 100. The system comprises a container wrapped with an insulating label stock so as to cover a significant portion of the surface area of the container. The container may be a can or bottle suitable for safe storage and consumption of beverages and foods. A can is shown at 90 and 110, respectively, in FIGS. 3 and 4, a bottle is shown at 115 in FIG. 5. Or the container may be a cup as shown at 140 in FIG. 6. Alternatively, the container may be a pouch, and in some cases, the label may become the pouch itself. The container is wrapped with an insulating label made from a label stock as described above with respect to FIGS. 1 and 2. The label may be bonded either to the container, or to itself along overlapping edges, such as edge 130 in FIGS. 3–6.

Figure 4:
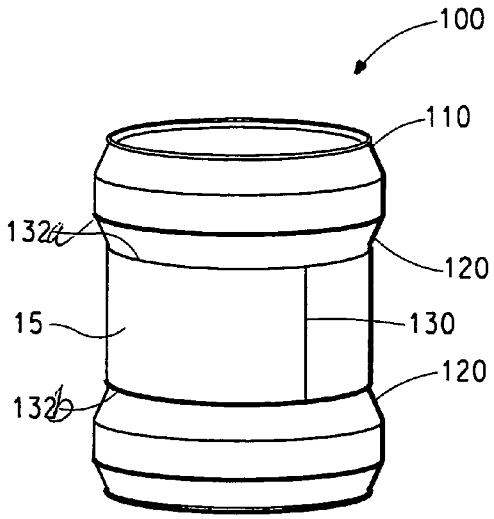
FIG. 4 is a perspective view of a container with indentations wrapped with a label cut from a label stock in accordance with the present invention.
Figure 5:
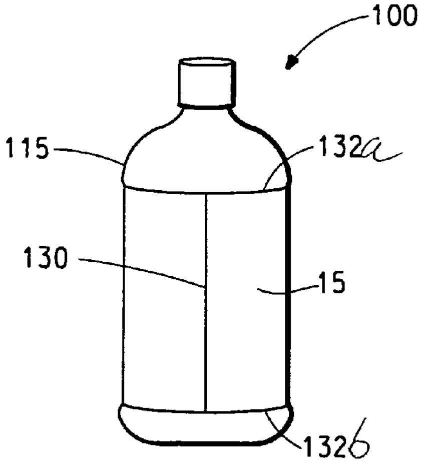
FIG. 5 is a perspective view of a bottle wrapped with a label cut from a label stock in accordance with the present invention.
Figure 6:
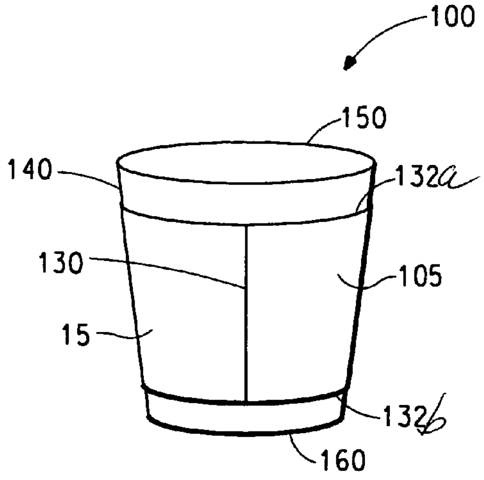
FIG. 6 is a perspective view of a cup wrapped with a label cut from a label stock in accordance with the present invention.

In the embodiment of FIG. 4, the label of the present invention is applied to can 110 which has been designed to have suitable indentations 120. These indentations hold the label in place if edges 130 of the label are secured to each other by adhesive or by the application of heat. In the embodiment of FIG. 6, cup 140 is of the type commonly used for single serving sizes of hot beverages, such as a disposable coffee cup. Alternatively, the cup may be a carton, such as an ice cream carton. If the cup is of a conic section design, as in FIG. 6, where the top circumference, shown at 150, is significantly larger than the bottom circumference, shown at 160, the label made from the label stock of the present invention may be shaped in a similar conic section shape so as to fit the cup snugly. In this case, an adhesive would hold the label on the cup.

Instead of forming a unitary label stock, it is also possible to attach a thermal insulating layer to a container, and then adhere a face material to the thermal insulating layer. A face material, or shrink wrap cover label, could then be applied to the thermal insulating layer. An example of a thermal insulating layer which can be used in this configuration is a knit tube which is cut to length and slipped over the can. Alternatively, a hot melt glue may be blown onto the can area that is to be insulated, building a layer of lofty fibrils to a desired thickness.

Further in accordance with the present invention, there is provided a method for making an insulating label stock. This method is illustrated with reference to FIG. 7. In this method, a sheet of material used for the thermal insulating layer, such as fiberfill batt 30, is fed from a supply roll 45. In addition, face material 10 is fed from a supply roll 40 and is disposed such that coating 12 is oriented away from thermal insulating layer 30 and second layer 14 is facing thermal insulating layer 30. In addition, face material 20 may be fed from a supply roll 50 and is disposed such that the adhesive layer (if required, such being shown at 26 in FIG. 1) is oriented away from the thermal insulating layer. The first layer, such as 13 as shown in FIGS. 1 and 2 and 22 as shown in FIG. 1, of the face material is oriented away from the thermal insulating layer, and the second layer of the face material, such as 14 in FIGS. 1 and 2 and 24 as shown in FIG. 1, faces the thermal insulating layer.

Figure 7:
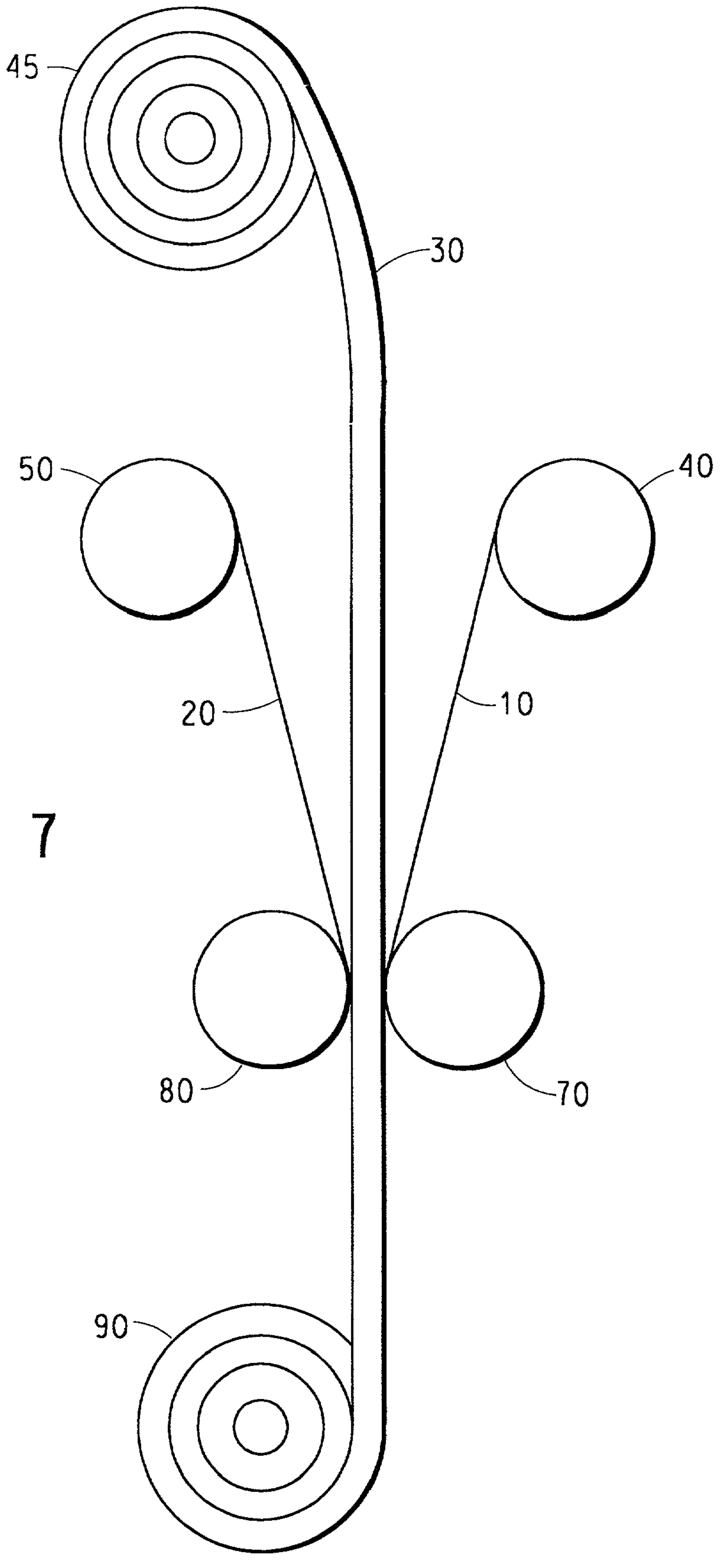
FIG. 7 is a schematic view of one apparatus suitable for making the label stock according to the present invention.

A sheet of the thermal insulating layer, such as 30, and at least one sheet of face material, such as 10 are fed into a heated calendar roll nip between a pair of heated calendar rolls 70 and 80, shown in FIG. 7. The heated calendar rolls cause the surfaces of the thermal insulating layer and the face material to adhere to each other. The calendar rolls are heated to a temperature which activates the heat-sealable layer but which does not melt the entire face material as discussed above. This temperature is in the range of 200° F. to 500° F. (93° C. to 260° C.), with the preferred temperature range being 280°–320° F. (137°–160° C.) for the embodiment using co-extruded 48 gauge and 120 gauge films as the face material and a fiberfill batt as the insulating layer. However, higher temperatures in the range of 450°–500° F. (232°–260° C.) can be used at high line speeds, i.e., speeds of 300 to 400 feet (91 to 122 meters) per minute. The calendar rolls are displaced from one another at a distance appropriate to create a nip pressure suitable for lamination. Alternatively, instead of using a coextruded heat sealable film, an adhesive may be applied between the face material and the thermal insulating layer to adhere them together. This adhesive would be applied by a coating roller, not shown, which would be positioned between feed rolls 40 and 50 and calendar rolls 70 and 80 in FIG. 7. A label stock is formed which is pulled through the process equipment by means of a take-up roll 20 as shown in FIG. 7.

A label stock with a thickness of greater than 0.0075 inch (0.0190 cm.), preferably between 0.010 inch (0.025 cm.) and 0.040 inch (0.102 cm.), and most preferably between 0.020 inch (0.051 cm.) and 0.030 inch (0.076 cm.) is thus produced. This label stock could be the label stock with one sheet of face material, as in FIG. 2, or two sheets of face material, as in FIG. 1, since the thickness of the face material is insignificant compared to the total thickness of the label stock. The formation of the label stock may be followed by cutting to desired widths with a hot knife which seals top and bottom edges, 132*a* and 132*b*, respectively, of the label stock. In the embodiment where two sheets of face material are used, the two sheets of face material are sealed together along these top and bottom edges. The label may then be cut to form labels, which may preferably have sealed edges, including top edge 132*a,* bottom edge 132*b*, as well as side edges 130. In this case, the two sheets of face material may also be sealed together along the side edges, as well as the top and bottom edges.

Alternatively, instead of using a single sheet of face material, the thermal insulating layer may be fed between two sheets of face material into the heated calendar roll, which causes the surfaces of the thermal insulating layer and the face material to adhere to each other. This embodiment is also illustrated in FIG. 7, where both face materials 10 and 20 are fed to the nip between heated calendar rolls 70 and 80. In either embodiment where either one or two sheets of face material are fed between heated calendar rolls, the thermal insulating layer batt may be previously printed, thereby eliminating the need for coating the face material to make it printable.

It should be apparent to those skilled in the art that modifications may be made to the method of the present invention without departing from the spirit thereof. For instance, the present invention may alternatively include a method for making an insulating label stock, wherein a card web comprising thermoplastic staple fibers is fed from a commercially available card machine. This card web is run in place of the fiberfill batt in the process described above with respect to FIG. 7, thereby being deposited directly onto a face material. The card web and face material are subjected to a calendaring process, thereby laminating the fibers from the card web to the face material. It should be noted that the label stock made in accordance with this embodiment is by design thinner than the preferred embodiment thickness, which is between 0.020 inch (0.051 cm.) and 0.030 inch (0.076 cm.), but still would be greater than 0.0075 inch (0.0190 cm.).

The present invention will be illustrated by the following Examples. The test method used in the Examples is described below.

TEST METHOD

For the following Examples, CLO was measured on a "Thermolabo II", which is an instrument with a refrigerated bath, commercially available from Kato Tekko Co. L.T.D., of Kato Japan, and the bath is available from Allied Fisher Scientific of Pittsburgh, Pa. Lab conditions were 21° C. and 65% relative humidity. The sample was a one-piece sample measuring 10.5 cm×10.5 cm.

The thickness of the sample (in inches) at 6 gm/cm$^2$ was determined using a Frazier Compressometer, commercially available from Frazier Precision Instrument Company, Inc. of Gaithersburg, Md. To measure thickness at 6 g/cm$^2$, the following formula was used to set PSI (pounds per square inch) (kilograms per square centimeter) on the dial:

$$\frac{(6.4516\ \text{cm}^2/\text{in}^2)(6\ \text{g/cm}^2)}{453.6\ \text{g}} = 0.8532\ \text{lb/in}^2$$

A reading of 0.8532 on the Frazier Compressometer Calibration Chart (1 in., or 2.54 cm. diameter presser foot) shows that by setting the top dial to 3.5 psi (0.2 kilograms per square centimeter), thickness at 6 g/cm$^2$ was measured.

The Thermolabo II instrument was then calibrated. The temperature sensor box (BT box) was then set to 10° C. above room temperature. The BT box measured 3.3 inch×3.3 inch (8.4 cm×8.4 cm). A heat plate measuring 2"×2" was in the center of the box, and was surrounded by styrofoam. Room temperature water was circulated through a metal water box to maintain a constant temperature. A sample was placed on the water box, and the BT box was placed on the sample. The amount of energy (in watts) required for the BT box to maintain its temperature for one minute was recorded. The sample was tested three times, and the following calculations were performed:

$$\text{Heat Conductivity (W/cm °C.)} = \frac{(W)(D \times 2.54)}{(A)(T)}$$

Where:
- W=Watts
- D=Thickness of sample measured in inches at 6 g/cm$^2$. (6 g/cm$^2$ was used because the weight of the BT box is 150 gm, the area of the heat plate on the BT box was 25 cm$^2$). Multiplying the thickness by 2.54 converted it to centimeters.
- A=Area of BT Plate (25 cm)
- T=10° C.

$$CLO = \frac{\text{Thickness} \times 0.00164}{\text{Heat Conductivity}}$$

The value of 0.00164 was a combined factor including the correction of 2.54 (correcting thickness from inches to centimeters) times the correction factor of 0.0006461 to convert thermal resistance in cm$^2$×° C./Watts. To convert heat conductivity to resistance, conductivity was put in the denominator of the equation.

EXAMPLE 1

A label stock was made according to the process described above with respect to FIG. 7, except that instead of feeding face materials 10 and 20 from supply rolls, they were fed as individual sheets to the nip. The label stock was cut to a length to form a label. A fiberfill batt of the type sold by E.I. du Pont de Nemours and Company of Wilmington, Del. under the trademark THERMOLITE® Active Original was used as the thermal insulating layer. The fiberfill batt had an areal weight of 100 gm/m$^2$ at a specified thickness of 0.25 inch (0.63 cm), or a bulk density of 0.013 gm/cm$^3$.

The films used as the face material were of the type sold by DuPont Teijin Films of Wilmington, Del. under the tradmark MELINEXO® 301-H. (This film was the same film as MELINEX® 854 as described above, but it did not include the primer coating, such as 12 and 26 as shown in FIG. 1). The composition of the heat-sealable layers (e.g., 14 and 24 in FIG. 1) was an isophthalic acid-based copolyester and comprised 10–50% of the total film thickness; 15–30% was preferred. In this embodiment, face material 10 was 1.2 mils (0.0012 inch, or 0.0030 cm) thick and face material 20 was 0.48 mils (0.00048 inch, or 0.00122 cm) thick. The final label stock thickness, after lamination, was 0.025 inch (0.064 cm). A label was made from this label stock which was wrapped around a can. Another label was made from this label stock which was wrapped around a blown polyester bottle.

Figure 8:
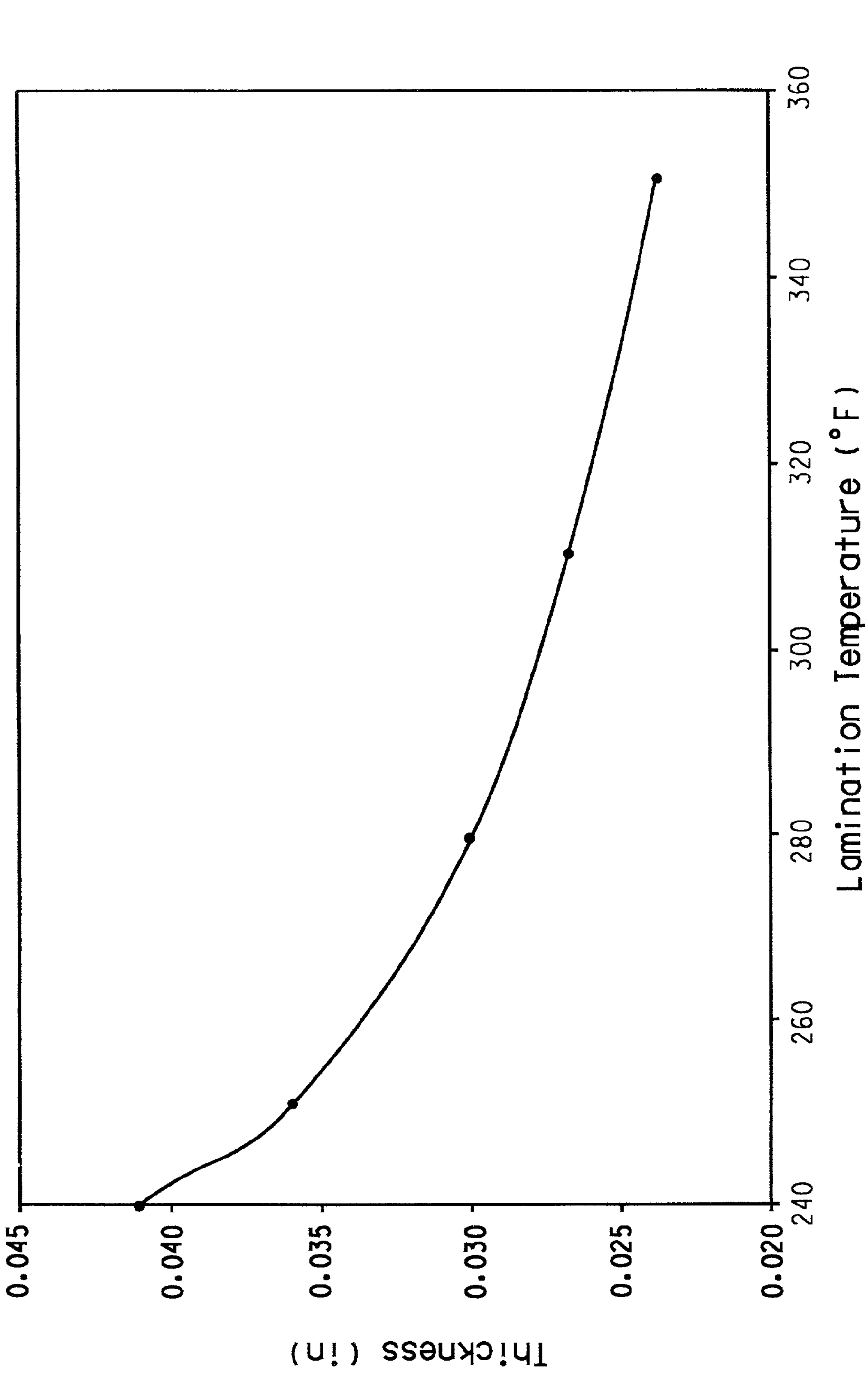
FIG. 8 is a graph showing the temperature at which the heat sealable layers of the face material were activated vs. the thickness of the label stock made in Example 1.
Figure 9:
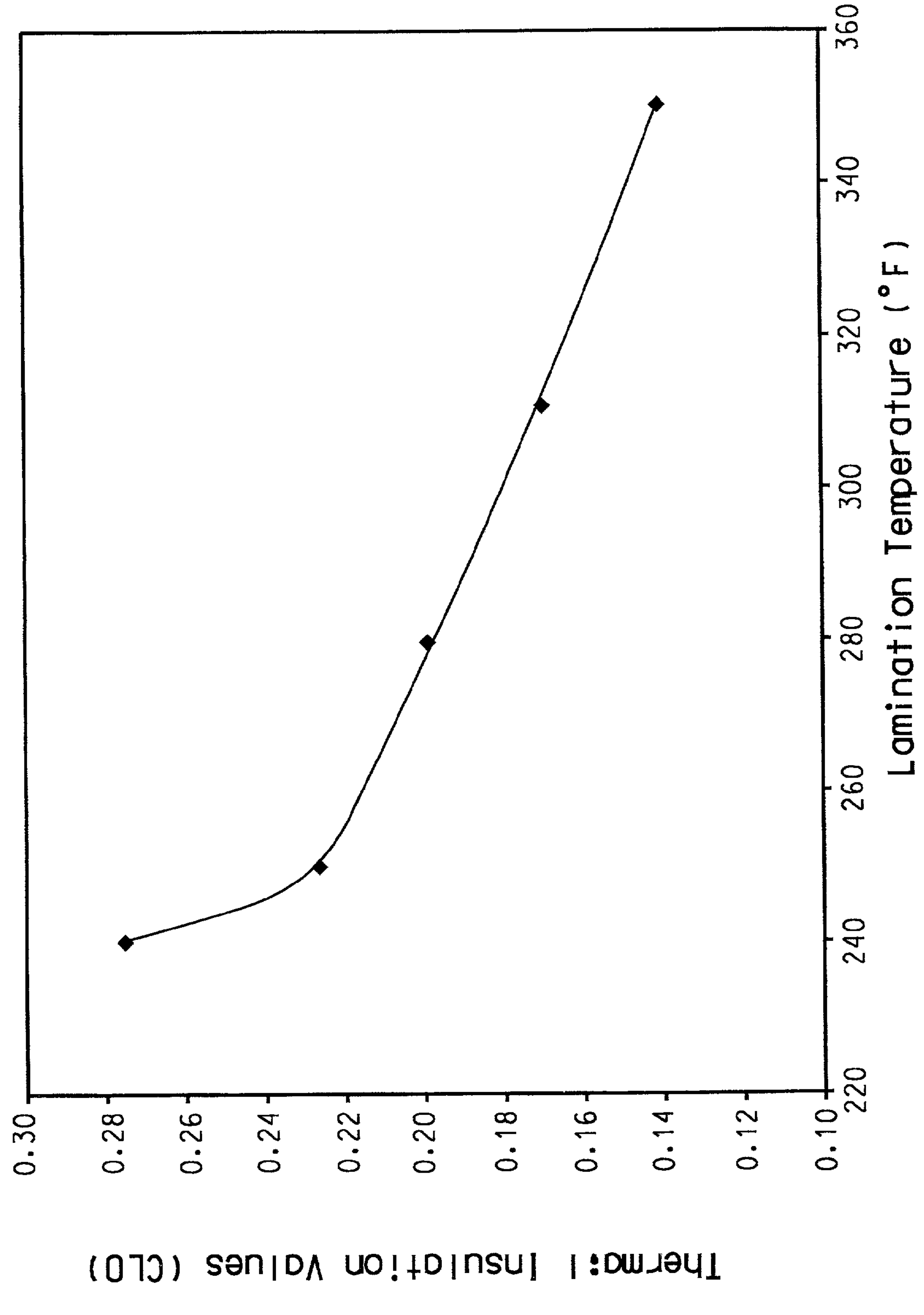
FIG. 9 is a graph showing the temperature at which the heat sealable layers of the face material were activated and laminated to the thermal insulating layer vs. thermal insulation values, as measured in CLO, of the label stock made in Example 1.

The heat sealable layers were activated at temperatures between 240 and 350° F. (116–177° C.). The data is shown in TABLE 1 below, and is graphed in FIGS. 8 and 9. As can be seen from FIGS. 8 and 9, the effect of using different activation temperatures is to give greater thickness and greater insulation values at the lower temperatures, and less thickness and lower insulation values at the higher temperatures.

TABLE 1

| Temp (° F.) (° C.) | Thickness (in) (cm) | Thermal Resistance CLO ($m^2$*K/W) |
|---|---|---|
| 240 (115) | 0.041 (0.104) | 0.272 (0.042) |
| 250 (121) | 0.036 (0.091) | 0.226 (0.035) |
| 280 (138) | 0.03 (0.076) | 0.199 (0.030) |
| 310 (154) | 0.027 (0.069) | 0.17 (0.026) |
| 350 (177) | 0.024 (0.061) | 0.141 (0.021) |

What is claimed is:

1. An insulating label stock, comprising a thermal insulating layer wherein the label stock is at least 0.0075 inch thick; the thermal insulating layer has a thermal resistance in the range of 0.05 to 0.5 CLO (0.0077 to 0.077 $m^2$*K/W) and laminated directly to a face material; the face material is a single sheet having a first layer and a second layer; and the second layer has a lower melting temperature than the first layer.

2. The insulating label stock of claim 1, wherein the face material is film.

3. The insulating label stock of claim 1, wherein the thermal insulating layer comprises a fiberfill batt.

4. The insulating label stack of claim 1, further including a coating on the face material, wherein the coating is printable.

5. The insulating label stock of claim 2, wherein the film is made of a thermoplastic material comprising polyester, polyethylene or polypropylene.

6. The insulating label stock of claim 1, wherein the face material is modified on the surface facing away from the thermal insulating layer to facilitate printing thereon.

7. The insulating label stock of claim 1, wherein the face material is modified on the surface facing away from the thermal insulating layer to facilitate bonding to another surface with adhesive.

8. The insulating label stock of claim 1, wherein the label stock has thickness in the range of 0.010 inch (0.025 cm) to 0.040 inch (0.102 cm).

9. The insulating label stock of claim 1, wherein the face material comprises a biaxially oriented polyester film.

10. The insulating label stock of claim 1 wherein the second layer is disposed between the thermal insulating layer and the first layer.

11. The insulating label stock of claim 10, further including another face material disposed on the side of the thermal insulating layer facing away from the second layer wherein the another face material is not a release backing sheet.

12. The insulating label stock of claim 1, further including an adhesive primer layer applied to the surface of the face material facing away from the thermal insulating layer.

13. The insulating label stock of claim 12, further including a release liner provided on the surface of the adhesive primer layer facing away from the face material.

14. An insulating label, comprising a thermal insulating layer having a thermal resistance in the range of 0.05 to 0.5 CLO (0.0077 to 0.077 $m^2$*K/W) which is laminated directly between two sheets of face material, wherein the label has a top edge, a bottom edge, and a side edge disposed at each side between the top and the bottom edge, and the two sheets of face material are sealed together along the top, bottom and side edges so that fluid cannot penetrate the edges of the insulating label.

15. The insulating label of claim 14, wherein the face material comprises a first sheet of coextruded film, wherein the first sheet of coextruded film comprises a first layer and a second layer, wherein the second layer is disposed between the thermal insulating layer and the first layer.

16. The insulating label of claim 15, wherein the face material further comprises a second sheet of coextruded film, wherein the second sheet of coextruded film comprises a first layer and a second layer and is disposed on the side of the thermal insulating layer opposite the first sheet of coextruded film.

17. The insulating label of claim 14, wherein the face material comprises a biaxially oriented polyester film.

18. An insulating label stock, comprising: a) a thermal insulating layer having a thermal resistance in the range of 0.05 to 0.5 CLO (0.0077 to 0.077 $m^2$*K/W); b) a face material, the thermal insulating layer being directly laminated to the face material, the face material comprising a first sheet of biaxially oriented polyester film comprising a first layer and a second layer disposed on one side of the thermal insulating layer, and a second sheet of biaxially oriented polyester film comprising a first layer and a second layer disposed on the other side of the thermal insulating layer, wherein the label stock has a top edge and a bottom edge, and the first and second sheets of biaxially oriented polyester film are sealed together along the top and bottom edges, so that fluid cannot penetrate the top and bottom edges of the insulating label stock, and further wherein the label stock has a thickness greater 0.0075 inch (0.0190 cm).

19. An insulating label stock, comprising: a) a thermal insulating layer selected from the group consisting of a fiberfill batt, melt blown fibers, knit fabric, woven material, and fleece; said thermal insulating layer having a thermal resistance in the range of 0.05 to 0.5 CLO (0.0077 to 0.077 $m^2$*K/W); and b) a face material, the thermal insulating layer being directly laminated to the face material, the face material comprising a first sheet of biaxially oriented polyester film comprising a first layer and a second layer disposed on one side of the thermal insulating layer, and a second sheet of biaxially oriented polyester film comprising a first layer and a second layer disposed on the other side of the thermal insulating layer.

* * * * *